United States Patent
Newton

(10) Patent No.: US 9,177,317 B2
(45) Date of Patent: Nov. 3, 2015

(54) SYSTEM AND METHOD FOR CONSUMER PROTECTION

(75) Inventor: Clay D. Newton, Napa, CA (US)

(73) Assignee: Bank of America Corporation, Charlotte, NC (US)

( * ) Notice: Subject to any disclaimer, the term of this patent is extended or adjusted under 35 U.S.C. 154(b) by 1800 days.

(21) Appl. No.: 11/864,199

(22) Filed: Sep. 28, 2007

(65) Prior Publication Data

US 2009/0089215 A1 Apr. 2, 2009

(51) Int. Cl.
| | |
|---|---|
| G06Q 40/00 | (2012.01) |
| G06Q 20/40 | (2012.01) |
| G06F 21/44 | (2013.01) |
| G06Q 20/38 | (2012.01) |

(52) U.S. Cl.
CPC .............. *G06Q 20/40* (2013.01); *G06F 21/445* (2013.01); *G06Q 20/3821* (2013.01)

(58) Field of Classification Search
USPC ............................................ 705/44; 713/182
See application file for complete search history.

(56) References Cited

U.S. PATENT DOCUMENTS

| | | | | |
|---|---|---|---|---|
| 2001/0037294 | A1* | 11/2001 | Freishtat et al. | 705/39 |
| 2002/0019828 | A1* | 2/2002 | Mortl | 707/200 |
| 2002/0112171 | A1* | 8/2002 | Ginter et al. | 713/185 |
| 2006/0167799 | A1* | 7/2006 | Wehunt et al. | 705/50 |
| 2006/0271789 | A1* | 11/2006 | Satomura et al. | 713/183 |
| 2007/0033392 | A1* | 2/2007 | Ganesan et al. | 713/155 |
| 2007/0130518 | A1* | 6/2007 | Shavit et al. | 715/530 |
| 2008/0098031 | A1* | 4/2008 | Ducharme | 707/104.1 |
| 2008/0162338 | A1* | 7/2008 | Samuels et al. | 705/38 |

* cited by examiner

*Primary Examiner* — Tsan-Yu J Huang
(74) *Attorney, Agent, or Firm* — Banner & Witcoff, Ltd.; Michael A. Springs

(57) ABSTRACT

A method for combating website spoofing can be used in connection with a website for a financial institution accessible by a plurality of users. Registration information is stored for a user having a financial account with the financial institution, including user login information and customization information for a website associated with the financial institution. A marker is issued, to be stored on a computer used by the user to access the website. At some point, a request is received from the user to display a webpage of the website on the computer, and the user is recognized based on the marker. A webpage is then provided to the computer, having an interface with an attribute customized according to the customization information. The user login information is entered via the website. Upon receiving the user login information, the user is provided access to the financial account.

18 Claims, 4 Drawing Sheets

SYSTEM AND METHOD FOR CONSUMER PROTECTION

TECHNICAL FIELD

The invention relates to a system and method for protection of private information, and, more specifically, to a system for combating website spoofing through personalization and customization.

BACKGROUND

The Internet is frequently used to transmit and receive private information and to manage finances. Despite the many existing protections provided for online transmissions, unscrupulous persons have created ways to steal private information, gain access to financial accounts, and engage in other such unauthorized activity, using the Internet. One way in which this can be accomplished is through creation of a false website, using a technique known as "spoofing." Creation of a false website can be performed by simply copying existing HTML code that is displayed to all users who access the website. Spoofing relies on mimicry of the website to lure users into entering data, such as private and/or secret information, which is then used by the spoofer. For example, the spoofer may create a false website for a financial institution, and the user may enter private information into the false website, such as a user identification, password, PIN number, account number, and the like. This private information can then be used by the spoofer to gain access to the user's account information, including authentication credentials, which can be used to access additional private information and steal funds from the customer's account.

Spoofers typically use a technique known as "phishing" to lure users to the spoofed website. Phishing entails sending a large number of false emails purporting to be from an established entity, such as a financial institution, and may provide a link or other direction to the spoofed website. These emails fool a small, but significant, number of users into accessing the spoofed website and providing private information, in the mistaken belief that the website is authentic. Thus, spoofing relies on lack of knowledge by the user of the authenticity of the website, and spoofing can be defeated if the customer knows the website is not authentic.

Various techniques have been used to mitigate the effects of spoofing, including tiered authentication, visual differentiation, controlled communications, and the like. However, these existing techniques have certain disadvantages and drawbacks.

BRIEF SUMMARY

The present system and method are provided to solve the problems discussed above and other problems, and to provide advantages and aspects not provided by prior systems and methods of this type.

Aspects of the present invention relate to a method for combating website spoofing for a website for a financial institution accessible by a plurality of users. Registration information is stored for a user having a financial account with the financial institution. The registration information includes user login information and customization information for a website associated with the financial institution. A marker is issued, to be stored on a computer used by the user to access the website. At some point, a request is received from the user to display a webpage of the website on the computer, and the user is recognized based on the marker. A webpage is then provided to the computer, having an interface with an attribute customized according to the customization information. The user login information is entered via the website. If the webpage provided is a login page, the login information may be entered via the login page. Upon receiving the user login information, the user is provided access to the financial account.

A second webpage may also be provided to the computer, subsequent to receiving entry of the user login information, the second webpage having an interface with a second attribute customized according to the customization information.

The attributes that may be customized by including content selectable by the user. In one embodiment, the content selectable by the user is obtainable from a syndicated content source. For example, the attribute may be selected from the group consisting of: text font, text color, arrangement of features on the interface, background color, one or more selectable images, background appearance, and border appearance.

A plurality of users can access the website and be provided with webpage interfaces customized according to instructions specific to the particular user. Each user is detected by the marker issued to the user's computer. Additionally, several users can access the website using the same computer, and several markers will be issued to be stored on the same computer. The user is recognized by receiving a user identification in response to a prompt for user identification provided to the computer, based on the plurality of markers.

Additional aspects of the present invention relate to a system containing a memory for storing information and components configured for performing steps of the disclosed method. The components may be computer components, including a memory, a processor, and/or computer-executable instructions.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

To understand the present invention, it will now be described by way of example, with reference to the accompanying drawings in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
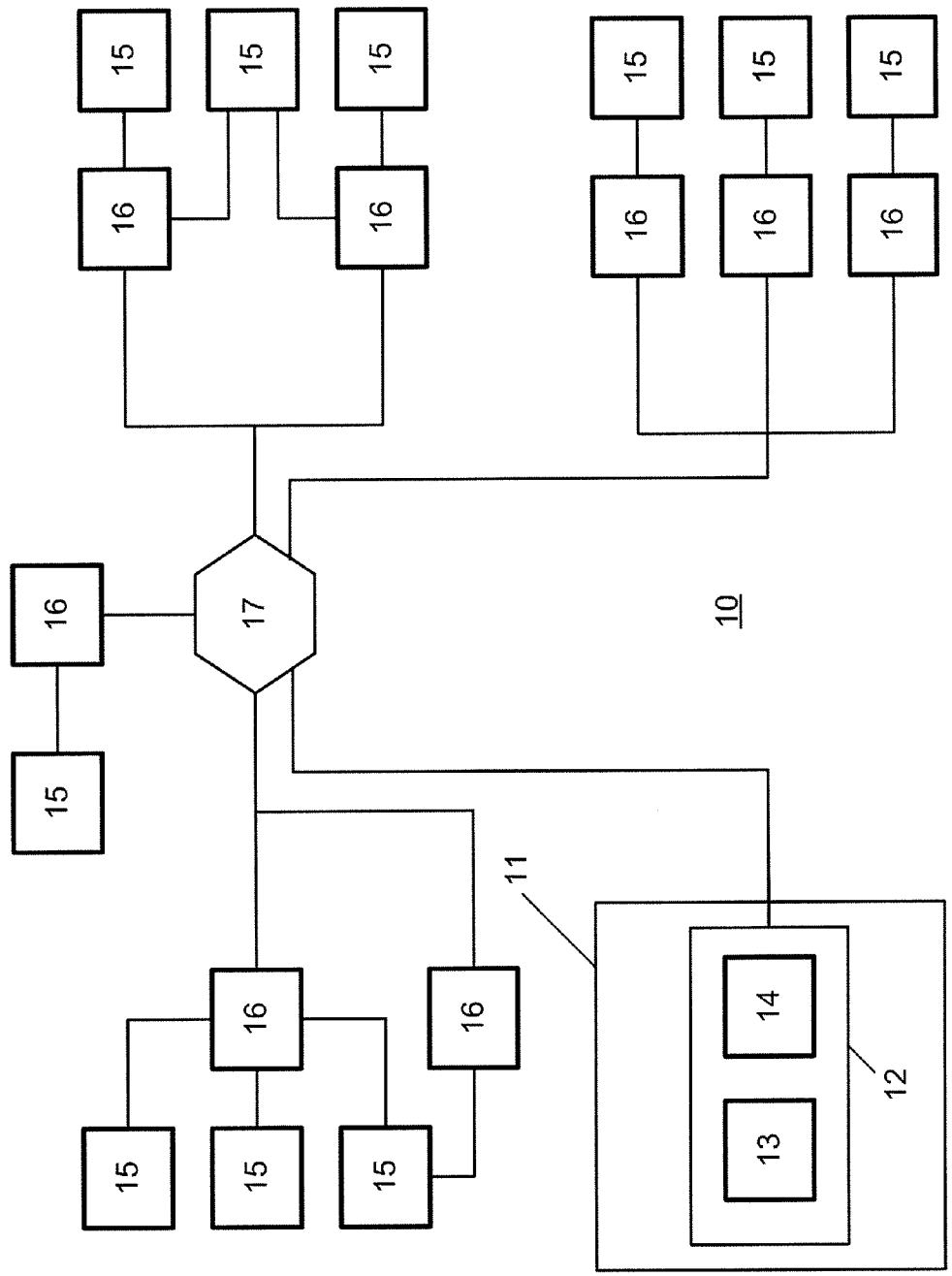
FIG. 1 is a schematic diagram of a system in accordance with at least one aspect of the present invention.

FIG. 1 illustrates an example of a system 10 that is capable of utilizing aspects of the present invention. Aspects of the present invention may be used by or in connection with a bank or other financial institution 11, such as an investment firm or other business, or a government institution. Such a financial institution may include a computer system 12 having a processor 13 and a memory 14. It is understood that a computer system 12, single processor 13, and single memory 14 are shown and described for sake of simplicity, and that the computer system 12, processor 13, and memory 14 of the financial institution 11 may include a plurality of computer systems, processors, and memories respectively. The same is true of other computers and computer systems, processors, and memories referred to herein. A plurality of users 15 may access the computer system 12 using a plurality of computers 16 that communicate with the computer system 12 over a network 17, such as the Internet. As shown in FIG. 1, more than one user 15 may communicate with and access the computer system 12 using the same computer 16. As also shown in FIG. 1, a single user 15 may access the computer system 12 using more than one computer 16.

The users 15 may each have one or more financial accounts with the financial institution 11, such as checking accounts; savings accounts; various investment accounts; mortgages, credit lines, or other debt accounts; or any other financial account. Information 20 regarding these financial accounts may be contained in the memory 14, including account balance, history, personal information, and other such account information. The users 15 may access the account in the computer system 12 to obtain or change the account information 20, to conduct financial transactions, or to perform other actions, using the computer 16. The computer system 12 may contain various features to authenticate the user 15, to ensure that the person attempting to access the account is the proper user 15. In one embodiment, the authentication is performed by checking information entered by the person attempting to access the account against registration information 22 previously entered by the user 15 and stored in the memory 14. The registration information 22 may include user login information, such as login identification, a secret password or PIN number, a user email address, a social security number, an answer to a private question, or other identification information. Procedures for creating the registration information 22 and authenticating the user 15 are described in greater detail below.

Figure 2:
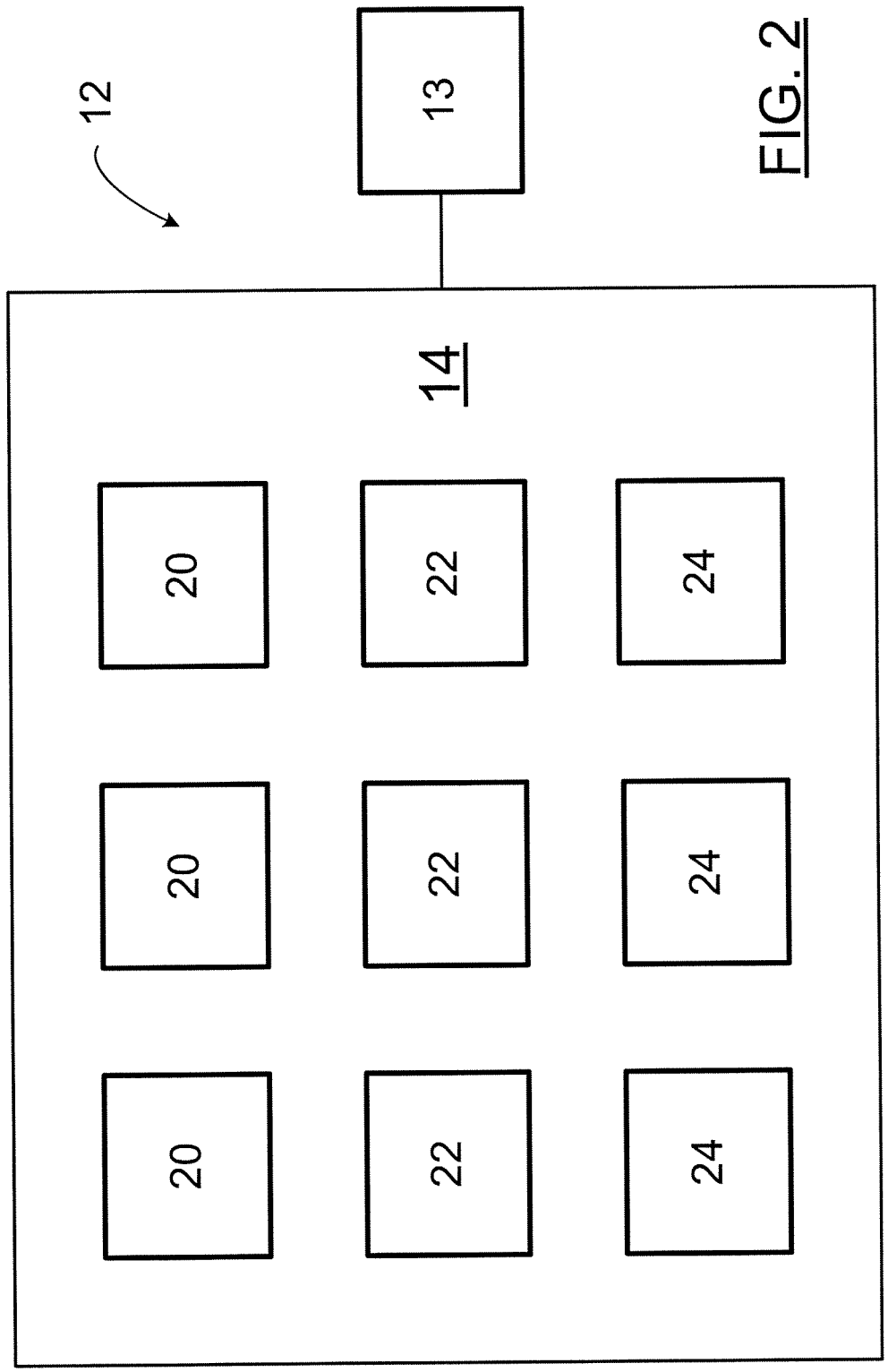
FIG. 2 is a schematic diagram of a computer system of the system of FIG. 1 in accordance with at least one aspect of the present invention.

FIG. 2 illustrates an example of a computer system 12 as illustrated in FIG. 1, including the processor 13 and the memory 14. Any type of information may be stored in the memory 14, including account information 20, user login information 22, and other types of information. The memory 14 may contain a database (not shown) for storing some or all of such information in an organized and easily accessible manner. The processor 13 is capable of processing the information in various ways, including making calculations using the information, and for performing other functions.

Aspects of the present invention are operational with numerous other general purpose or special purpose computing system environments or configurations. Examples of well known computing systems, environments, and/or configurations that may be suitable for use with the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the present invention may be described in the general context of computer-executable instructions, such as program modules, being executed by a computer. Generally, program modules include routines, programs, objects, components, data structures, and the like that perform particular tasks or implement particular abstract data types. The present invention may also be practiced in distributed computing environments where tasks are performed by remote processing devices that are linked through a communications network. In a distributed computing environment, program modules may be located in the memory 14, which may include both local and remote computer storage media including memory storage devices. It is understood that connections and communications disclosed herein may be made by any type of wired or wireless connection or communication.

Figure 3:
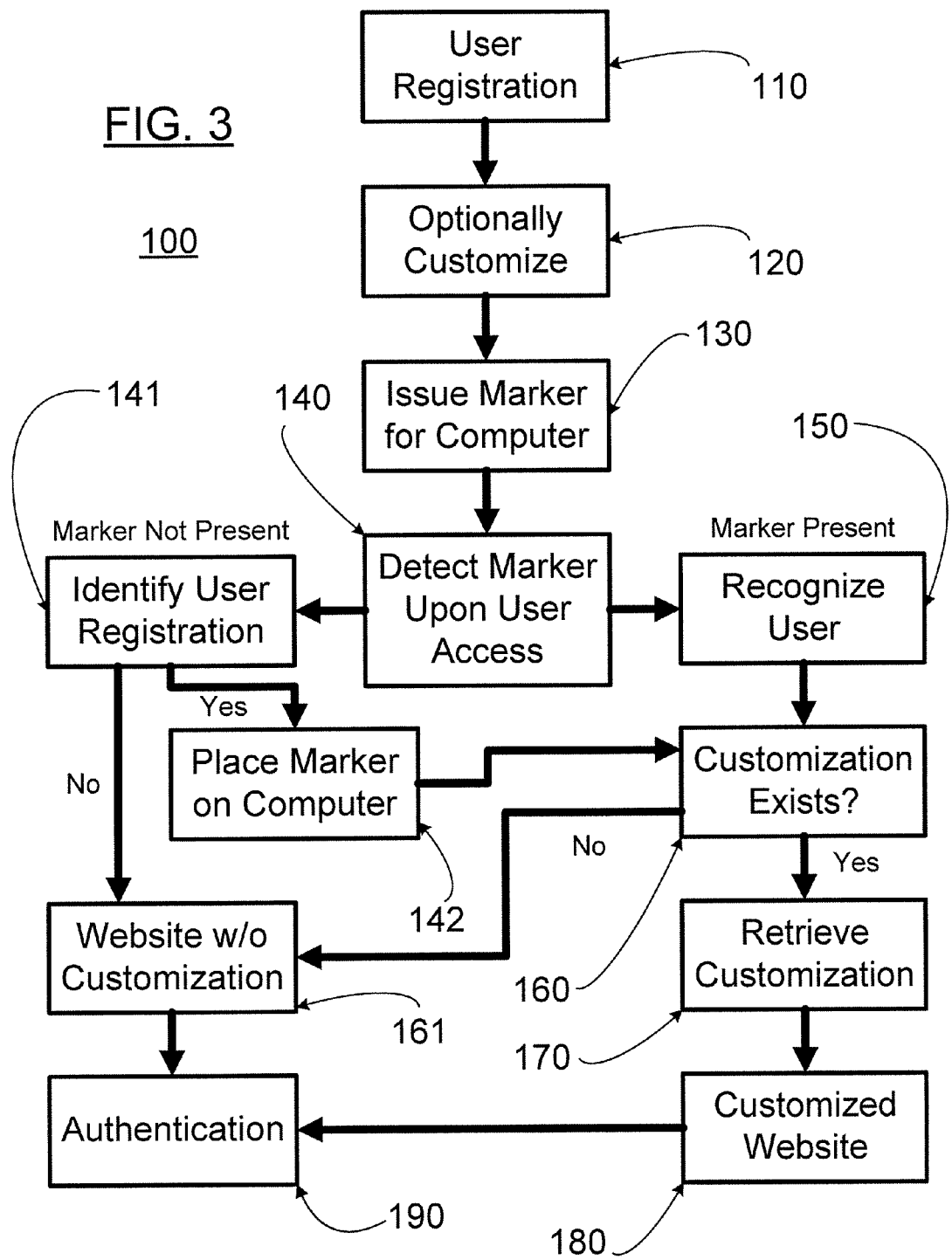
FIG. 3 is a flowchart illustrating a method of combating spoofing in accordance with at least one aspect of the present invention.

FIG. 3 illustrates one exemplary embodiment of a method 100 for combating spoofing, protecting customer information, and preventing fraud and identity theft. The method can be incorporated into the operation of a website associated with the financial institution 11, which includes at least one webpage. The website is accessible by the plurality of users 15, such as through the network 17, and enables the users 15 to access their accounts and related information on the computer system 12. In some embodiments, the website includes several webpages that serve a variety of purposes, including conveying information to the user and receiving input from the user. One type of such webpage is a user login page, which is configured to receive input of registration information 22, such as login information, from the user. A login webpage may be specifically designated for input of login information, or may serve purposes in addition to receiving login information, such as a welcome page. Additionally, the website can have authentication features and procedures, as described above, and may restrict access to certain information and pages of the website to authenticated users 15 only. Generally, each webpage has an interface that is presented to the user 15 to allow the user to interact with the website, such as a graphical user interface (GUI) presented to the user on a video device.

Figure 4:
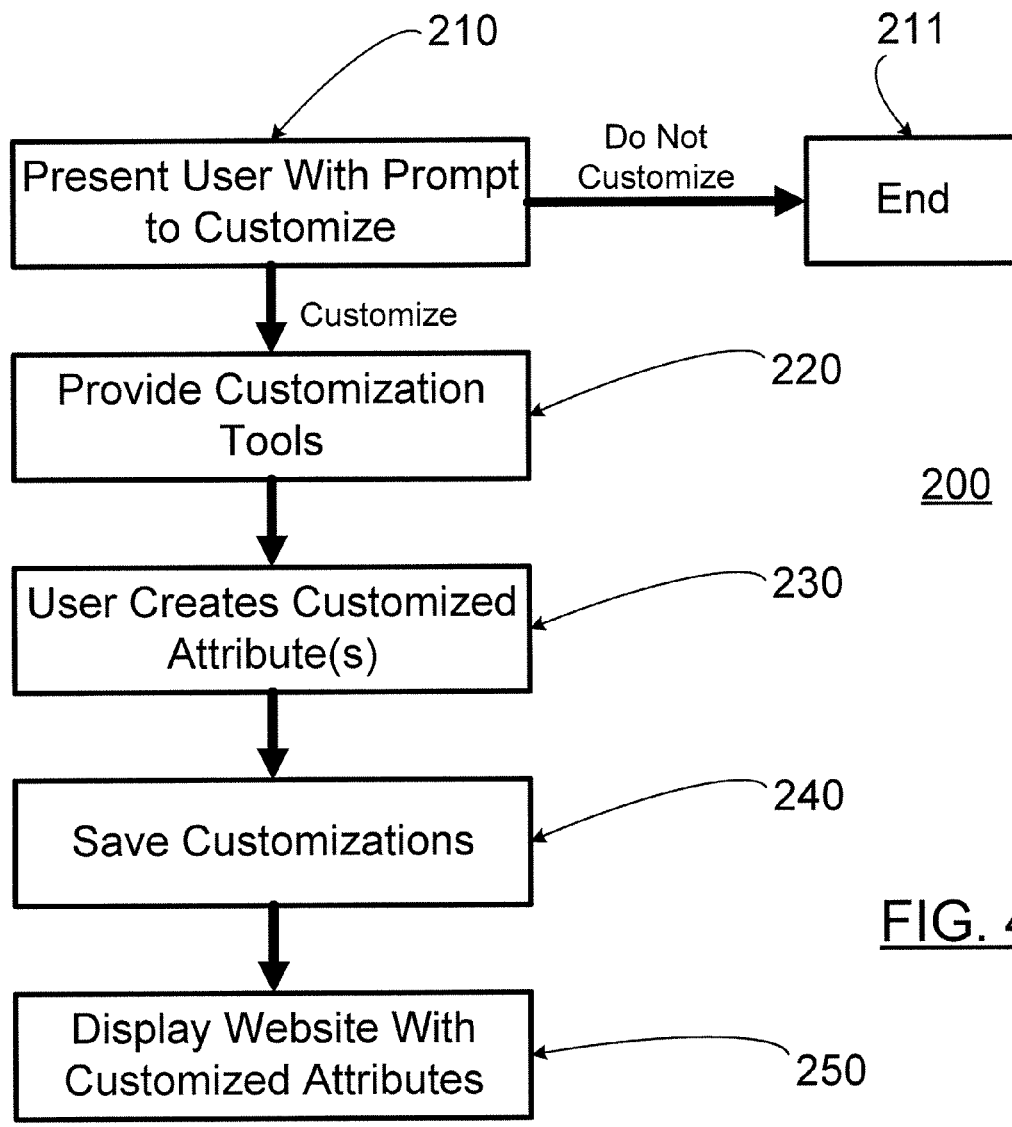
FIG. 4 is a flowchart illustrating a method of customizing a website in accordance with at least one aspect of the present invention.

The website interface is provided with at least one attribute that is customizable by each user 15 registered with the computer system 12. FIG. 4 illustrates a method for customizing the interface, as will be described below. In one embodiment, the interface is a GUI, and at least some of the customizable attributes are visual attributes of the interface. Examples of such customizable visual attributes include: font, color, and appearance of the text on the interface; the arrangement or layout of features on the interface; the color and appearance of the background of the interface; one or more selectable images that may be placed on the interface, including background images and placeholder images; and the appearance of a border or "skin" of the interface. In one embodiment, the user 15 may select a "theme" for the interface, rather than specific customizations. For example, the user 15 may select an "animals" theme or a "sports" theme that would be reflected on the interface. The theme may be static or evolving, where the interface may be continuously changed within the theme, such as by showing a different animal or sports team every week. Such an evolving theme greatly increases the difficulty in spoofing the website. In other examples, the theme may be a "four seasons" theme, which could change with the seasons, or a "comic strip" theme, where the periodic edition of the user's favorite comic strip may be displayed. Additionally, the customizable attribute may include content selectable by the user, including content supplied from other content sources, such as syndicated content on the Internet. For example, the interface may display pictures obtained by a syndicated photograph website associated with the user. The content may also be connected to the user's location or interests, such as local news and weather, stock portfolio information for the user, or the aforementioned comic strip. The customizable attributes may also include non-visual attributes, such as customized sounds or other audio effects. Still other examples of customizable attributes in accordance with aspects of the present invention would be recognized by one skilled in the art.

The website may also be provided with various tools for customization, including various applications that may be run through the website. For example, the website may enable the user 15 to visually rearrange or reorder features on the website, such as through "dragging and dropping." In another example, the website may provide buttons and drop-down menus for selecting different customizations. Other tools known in the art for assisting the user in customization may be used in connection with the website.

Referring to FIG. 3, at step 110, a user 15 having a financial account with the institution 11 performs an online user registration, which may be done through the website. The user 15 may have one or more existing financial accounts with the financial institution 11 prior to creation of the account, using the online registration to access the existing account(s), or the user 15 may create the online registration with the purpose of opening an account. The registration can include registration information 22, including login information, as described above, which can be used to later identify the user 15. The registration information 22 may be stored in the memory 14 as part of creating the user registration. It is understood that, in various embodiments, the registration may contain a different variety or amount of registration information 22, depending on the level of security desired for the website. For example, if the website does not provide access to a great deal of important user information or financial access, such as if the system 10 is used with a different type of institution or entity, the registration may contain much less information.

At step 120, the user optionally customizes one or more attributes of the website interface, as described above and as will further be described below with respect to FIG. 4. The computer system 12 may receive instructions from the user to customize the one or more attributes. Additionally, customization information 24, including such customization instructions, may be stored in the memory 14.

At step 130, the computer system 12 issues a marker to be placed on the computer 16 used by the user 15 to access the website. The marker enables the computer system 12 to recognize the user 15 when the user 15 subsequently accesses the website, based on the presence of the marker. The marker may be embodied in a "cookie", as known in the art. Additionally, the marker may be placed on the computer 16 automatically, or may be placed at the option of the user 15, such as by selecting an option to "remember" the computer.

At step 140, a user 15 attempts to access the website using a computer 16, and the computer system 12 detects whether the computer 16 contains a marker identifying the user 15. Because more than one user 15 may access the website using the same computer 16, the computer 16 may contain more than one marker. Additionally, because the user 15 may use more than one computer 16 to access the website, the computer 16 may not have a marker, or may not have a marker for that particular user. If the computer does not have a marker, the website is provided with the standard interface without customizations. The user is then able to select or identify a user registration, at step 141, and the computer system 12 recognizes the user based on the selection or identification. The user may be asked to provide registration information 22, such as login information, or other identification information to identify the appropriate user registration. If the computer has a marker, but not a marker for the particular user 15, the user is provided with the ability to identify another user registration in the same manner, at step 141, as described below. Once the user registration is selected, the computer system 12 issues a marker to be placed on the computer 16, at step 142, and the process then proceeds to step 160. If a user registration is not selected, the standard website interface, without customized attributes, is provided prior to login, at step 161, and the user 15 can then proceed to further authentication, at step 190.

If the computer 16 contains a marker for the user 15, the computer system 12 recognizes the user based on the marker, at step 150. If the computer 16 has only one marker, the user corresponding to the marker is recognized. If the computer has a marker, but not a marker for the particular user 15, the user is provided with the ability to proceed to selection of user registration at step 141, as described above, such as by clicking a link confirming that the user 15 has not been identified. If the computer 16 has more than one marker, the user 15 is presented with the option to select among the multiple user registrations associated with the various markers. In one embodiment, the computer system provides a prompt or request for user identification, such as a menu or list of user registrations, and the user 15 may select the appropriate user registration via the prompt. In this embodiment, the computer system 12 recognizes the user by receiving the user identification in response to the prompt.

Once a user is recognized, the computer system 12 determines whether any customizations are associated with the user registration, at step 160. In one embodiment, this is performed by checking for customization instructions or other customization information 24 stored in the memory 14. If the user 15 has not made any customizations, the standard interface is provided without customizations, at step 161, and the user 15 can then proceed to further authentication, at step 190.

If the user has customized one or more attributes of the website, at least one of the customizations is retrieved by the computer system, at step 170, and the interface is customized according to the instructions or other customization information 24, at step 180. The presence of these customized attributes enables the user 15 to recognize that the website is authentic, prior to entry of private login information 22 or other actions by the user 15 that may compromise the privacy and security of the user registration. The user 15 can then proceed to further authentication, at step 190.

At step 190, the user 15 is authenticated, by entering login information or other registration information 22 via the website, which is received by the computer system 12, in a known manner.

In some embodiments, if the user has customized one or more attributes of the website, some or all of the customizations may be displayed on the interface subsequent to entry of the login information (step 190). The customized attributes of the interface provided subsequent to login may include the same customized attributes provided prior to login, or may additionally or alternately include other customizations.

As discussed, FIG. 4 illustrates a method 200 of customizing a website interface, which can be used in connection with the method illustrated in FIG. 3 and described above. In the embodiment illustrated in FIG. 4, the user 15 has already created the user registration (at step 110), has accessed the website (step 140), and has been logged in or otherwise authenticated (step 190). In other embodiments, the customization may be performed at another time or in another situation. For example, when a prompt to customize the website is provided by an email or similar communication, as described below, the user 15 may be enabled to customize the website without accessing the website in the manner described above. In another example, described below, the customization may be performed in conjunction with creating the user registration, such as performed at step 110 of the method 100 of FIG. 3.

At step 210, the user 15 is presented with a prompt or request to customize the website interface. In one exemplary embodiment, the prompt is in the form of a link on the website that the user 15 may optionally follow, if the user wishes to customize the website. If the user chooses not to customize the website, at step 211, the process ends. In another embodiment, the prompt may be mandatory. For example, the website may be restricted from access by the user 15 until the user 15 provides at least one customization. Additionally, a user 15 who has not customized the website may be provided with a prompt that is more prominent or that more strongly suggests customization. In one embodiment, optional or mandatory customization may be provided as a part of creating the user registration, rather than after the user registration has been created. In further embodiments, the prompt may be delivered differently, such as through an email, instant message, text message, or other such communication. Still further types of prompts are recognizable to those skilled in the art.

If the user 15 chooses to customize the website, the computer system provides customization tools for use by the user 15 in creating the customized attributes, at step 220. Examples of such customization tools are described herein above.

The user 15 creates at least one customized attribute for the website using the customization tools, at step 230. In some embodiments, the user 15 may be allowed to customize a nearly limitless number of attributes, at the user's discretion. As described above, the user 15 may send customization instructions or other customization information that is received by the computer system 24.

Once the customized attribute has been created, the computer system 12 stores the instructions or other customization information 24 in the memory 14, at step 240. The website is then provided with the customized interface, having attributes customized according to the customization information 24, at step 250. The user 15 may also be provided with the option of customizing additional attributes or changing the original customizations, at a later time. In addition, the user may be prompted periodically to change the customizations to further increase the difficulty in spoofing a website. Such periodic customizations may be optional or mandatory in nature.

As stated above, FIGS. 3-4 illustrate an example of one or more aspects of a method for combating spoofing, protecting customer information, and preventing fraud and identity theft. The steps of the method described above can be accomplished by means and/or components contained within the computer system 12, such as the processor 13 and memory 14, and computer-executable instructions stored in the memory 14 and/or executed by the processor 13, including program modules, and may also be accomplished by non-computer means or components, such as by institutional employees. Other components of the system 10, the financial institution 11, and the computer system 12 may also constitute means for accomplishing aspects of the present invention, as understood by those skilled in the art. It is understood that the financial institution 11 and the computer system 12 may not perform each and every aspect of the present invention and that aspects may be delegated to one or more other entities.

Aspects of the present invention provide many benefits not provided by prior privacy protection systems and methods. In particular, the presentation of an interface having customized attributes decreases the chance of a customer mistaking a spoofed website for an authentic website. The time and effort put into the customization by the user increases the likelihood that the user will recognize the customization or lack thereof. Additionally, each customized attribute of the website interface adds to the difficulty of creating a spoofed website that can fool a customer. Features such as continuously evolving themes further increase the difficulty of spoofing the website. As a result, customers' private information and access to customers' financial accounts and records are less likely to be compromised. While the system and method described herein are useful in implementation by a financial institution, aspects of the present invention may be used by other types of entities to provide security for other types of websites. Further, in many situations, at least some of the aspects of the present invention may be accomplished using existing infrastructure, without requiring capital expenditures. Still other benefits and advantages exist and are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be in other specific forms without departing from the spirit or central characteristics thereof. The present examples therefore are to be considered in all respects as illustrative and not restrictive, and the invention is not to be limited to the details given herein. The term "plurality," as used herein, indicates any number greater than one, either disjunctively or conjunctively, as necessary, up to an infinite number. Accordingly, while the specific examples have been illustrated and described, numerous modifications come to mind without significantly departing from the spirit of the invention and the scope of protection is only limited by the scope of the accompanying claims.

What is claimed is:

1. A computer-assisted method comprising:
storing, in memory, registration information for a user having a financial account with a financial institution, the registration information comprising user login information for a website associated with the financial institution, wherein the website has a webpage with an interface having a visual icon attribute configured to be customized by the user;
receiving a first entry of the user login information for the user, at a processor in communication with the memory, via the website;
issuing a marker, from the processor, to be stored on a computer used by the user to access the website;
providing a prompt, from the processor to the computer, for the user to customize the visual icon attribute, wherein the prompt is mandatory and is provided after receiving the first entry of the user login information;
receiving, at the processor, instructions from the user to customize the visual icon attribute, in response to the prompt, wherein the prompt is delivered as at least one of: (i) a link on the webpage, (ii) an e-mail, (iii) an instant message, and (iv) text message;
receiving, at the processor, a request from the user to access the financial account via the website on the computer, subsequent to receiving the instructions, wherein a second entry of the user login information is required to access the financial account;
recognizing the user, by the processor, based on the marker;
providing the webpage, from the processor to the computer, in response to the request, wherein the interface of the webpage has the visual icon attribute customized according to the instructions;
receiving the second entry of the user login information for the user, at the processor, via the website, subsequent to providing the webpage with the visual icon attribute customized; and
providing the user access to the financial account upon receiving the second entry of the user login information.

2. The method of claim 1, wherein the interface has a plurality of visual icon attributes configured to be customized according to the instructions.

3. The method of claim 1, further comprising:
providing, from the processor to the computer, a second webpage for the website, subsequent to receiving the second entry of the user login information, the second webpage having an interface with a second visual icon attribute customized according to the instructions.

4. The method of claim 1, wherein the visual icon attribute is customized by including content selectable by the user.

5. The method of claim 4, wherein the content selectable by the user is obtainable from a syndicated content source.

6. The method of claim 1, wherein the visual icon attribute is selected from the group consisting of: text font, text color, arrangement of features on the interface, background color, one or more selectable images, background appearance, and border appearance.

7. The method of claim 1, further comprising:
storing, in the memory, registration information for a plurality of users, each having a financial account with a financial institution, the registration information for each user comprising user login information for a website associated with the financial institution, wherein the website has a webpage with an interface having a visual icon attribute configured to be customized by each user;
issuing a plurality of markers, from the processor, each marker to be stored on a computer used by one of the users to access the website;
receiving, at the processor, instructions from each user to customize the visual icon attribute;
receiving, at the processor, a request from each user to display the webpage on the user's computer;
recognizing each user, by the processor, based on the marker for the user;
providing the webpage, from the processor to each computer, wherein the interface of the webpage has the visual icon attribute customized according to the instructions from the user corresponding to the respective computer;
receiving entry of the user login information for each user, at the processor, via the website; and
providing each user access to each respective user's financial account upon receiving the user login information.

8. The method of claim 1, further comprising:
storing, in the memory, registration information for a plurality of users, each having a financial account with a financial institution, the registration information for each user comprising user login information for a website associated with the financial institution, wherein the website has a webpage with an interface having a visual icon attribute configured to be customized by each user;
issuing a plurality of markers, from the processor, each marker to be stored on the computer, wherein the computer is used by all of the users to access the website;
receiving, at the processor, instructions from each user to customize the visual icon attribute;
receiving, at the processor, a request from one of the users to display the webpage on the computer;
providing, from the processor to the computer, a prompt for user identification, based on the plurality of markers;
recognizing the user, by the processor, by receiving the user identification in response to the prompt;
providing the webpage, from the processor to the computer, wherein the interface of the webpage has the visual icon attribute customized according to the instructions from the recognized user;
receiving entry of the user login information for the recognized user, at the processor, via the website; and
providing the user access to the user's financial account upon receiving the user login information.

9. A computer system comprising:
a memory for storing information, including registration information for a user having a financial account with a financial institution, the registration information comprising user login information for a website associated with the financial institution, wherein the website has a webpage with an interface having a visual icon attribute configured to be customized by the user, the information further including computer-executable instructions; and
a processor in communication with the memory, the processor configured for executing the computer-executable instructions to perform the steps of:
receiving a first entry of the user login information for the user via the website;
issuing a marker to be stored on a computer used by the user to access the website;
providing a prompt, from the processor to the computer, for the user to customize the visual icon attribute, wherein the prompt is mandatory and is provided after receiving the first entry of the user login information;
receiving instructions from the user to customize the visual icon attribute, in response to the prompt, wherein the prompt is delivered as at least one of: (i) a link on the webpage, (ii) an e-mail, (iii) an instant message, and (iv) text message;
receiving a request from the user to access the financial account via the website on the computer, subsequent to receiving the instructions, wherein a second entry of the user login information is required to access the financial account;
recognizing the user based on the marker;
providing the webpage to the computer in response to the request, wherein the interface of the webpage has the visual icon attribute customized according to the instructions;
receiving the second entry of the user login information for the user via the website, subsequent to providing the webpage with the visual icon attribute customized; and
providing the user access to the financial account upon receiving the second entry of the user login information.

10. The system of claim 9, wherein the interface has a plurality of visual icon attributes configured to be customized according to the instructions.

11. The system of claim 9, wherein the processor is further configured for performing:
   providing to the computer a second webpage for the website, subsequent to receiving the subsequent entry of the user login information, the second webpage having an interface with a second visual icon attribute customized according to the instructions.

12. The system of claim 9, wherein the visual icon attribute is selected from the group consisting of: text font, text color, arrangement of features on the interface, background color, one or more selectable images, background appearance, and border appearance.

13. The method of claim 1, further comprising:
   providing periodic prompts, from the processor to the computer, subsequent to receiving the instructions from the user, for the user to customize the visual icon attribute differently than previously customized.

14. The method of claim 1, wherein the instructions to customize the visual icon attribute comprise a theme selected by the user, and wherein the webpage is provided with a variable customization of the visual icon attribute based on the theme.

15. The system of claim 9, wherein the processor is further configured for performing:
   providing periodic prompts, subsequent to receiving the instructions from the user, for the user to customize the visual icon attribute differently than previously customized.

16. The system of claim 9, wherein the instructions to customize the visual icon attribute comprise a theme selected by the user, and wherein the webpage is provided with a variable customization of the visual icon attribute based on the theme.

17. The method of claim 1, wherein the prompt requires mandatory customization by the user, and the website is restricted from further access until the instructions from the user to customize the visual icon attribute are received.

18. The system of claim 9, wherein the prompt requires mandatory customization by the user, and the website is restricted from further access until the instructions from the user to customize the visual icon attribute are received.

\* \* \* \* \*